United States Patent [19]
Vance

[11] Patent Number: 4,607,924
[45] Date of Patent: Aug. 26, 1986

[54] VIDEO PROJECTOR FOCUS ADJUSTMENT MECHANISM

[75] Inventor: Dennis W. Vance, Portola Valley, Calif.

[73] Assignee: Vivid Systems Incorporated, Fremont, Calif.

[21] Appl. No.: 678,035

[22] Filed: Dec. 4, 1984

[51] Int. Cl.[4] .............................................. G03B 3/00
[52] U.S. Cl. ................................................. 353/101
[58] Field of Search ............... 353/100, 101; 358/225, 358/227, 250, 231, 237; 350/255

[56] References Cited

U.S. PATENT DOCUMENTS

| | | | |
|---|---|---|---|
| 465,409 | 12/1891 | Knipe | 353/101 |
| 1,883,673 | 10/1932 | Fouquet | 350/255 X |
| 1,954,876 | 4/1934 | Joannides | 350/255 |
| 3,744,884 | 7/1973 | Filipovich et al. | 350/255 |

FOREIGN PATENT DOCUMENTS

| | | | |
|---|---|---|---|
| 612219 | 7/1926 | France | 353/122 |
| 1102253 | 5/1955 | France | 353/101 |

Primary Examiner—Harry N. Haroian
Attorney, Agent, or Firm—Kolisch, Hartwell & Dickinson

[57] ABSTRACT

A video projector focus adjustment mechanism for use with a video projector and a projection lens is provided. The mechanism includes first focusing device for slidably focusing a first focusing element and a second focusing device for rotatably focusing a second focusing element.

8 Claims, 5 Drawing Figures

VIDEO PROJECTOR FOCUS ADJUSTMENT MECHANISM

BACKGROUND AND SUMMARY OF THE INVENTION

This invention relates to a focus adjustment mechanism for use with a video projector. Specifically, the invention provides a mechanism for focusing a projection lens which has two focusing elements which must be independently adjusted to focus an image on a displaced, generally planar screen.

Several types of video projectors are known. This invention is intended for use with a video projector which utilizes a single source image generator as opposed to plural, color generators. A single source generator produces an image which must be focused with different components of refraction at its central and peripheral portions. Generally, one or the other portions of the image is focused and the remaining portion is sequentially focused.

Known projection lenses utilize either push-pull or mutually rotatable elements which may be adjusted to focus portions of the image. Known lenses do not provide any means for retaining a focus setting on one lens element while another lens element is focused.

An object of the invention is to provide a focus adjustment mechanism which will slidably focus a first focusing element operable to focus a peripheral portion of a projected beam.

Another object of the invention is to provide a focus adjustment mechanism which will rotatably focus a central portion of a projected beam.

A further object of the instant invention is to provide a focus adjust mechanism which is easily accessible from the exterior of a video projector.

Yet another object of the invention is to provide a focus adjustment mechanism which is simple and easy to operate.

Another object of the invention is to provide a focus adjustment mechanism which is capable of retrofitting conventional focus mechanisms.

The instant invention includes a video projector having a frame and imaging means mounted on the frame. The imaging means generates a visually perceptible beam which has an image axis, and central and peripheral portions which must be focused independently of one another. The video projector includes a two-focusing element projection lens. Retaining means are provided to retain the projection lens non-rotatably on the frame. A first focusing element includes a lens carrying portion which is slidably and non-rotatably received on retaining means and which includes a sleeve. A second focusing element is rotatably received on the sleeve of the first focusing element. A first focusing means is operable to slidably focus the first focusing element and includes a bracket which is attached to the frame and a lever which pivots on the bracket and on the lens carrying portion, thereby to slide the lens carrying portion relative to the retaining means. Second focusing means is provided for rotatably focusing a second focusing element with rotation of the second element relative the first element.

These and other objects and advantages of the instant invention will become more fully apparent as the description which follows is read in conjunction with the drawings.

DETAILED DESCRIPTION OF THE PREFERRED EMBODIMENT

Figure 1:
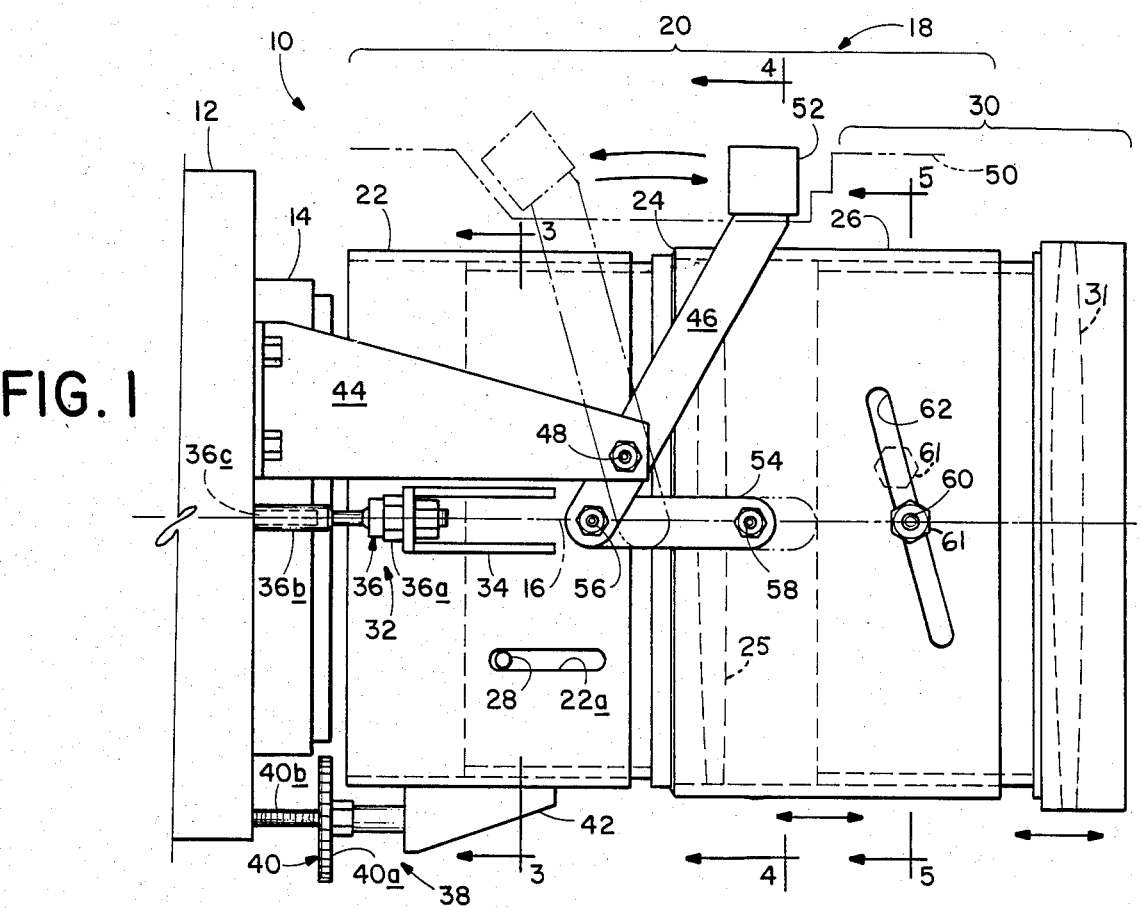
FIG. 1 is a side elevation of a video projector, with portions broken away, which incorporates a focus adjustment mechanism constructed according to the instant invention.

Turning initially to FIG. 1, a video projector incorporating the instant invention is shown generally at 10. The projector includes a frame 12, and imaging means 14 mounted on the frame. The imaging means generates a visually perceptible beam having an image axis 16. As previously described, in order to form a coherent image on a spaced apart, generally planar projection screen, the beam generated by imaging means 14 must be refracted or focused with different settings for its central and peripheral portions.

A projection lens, shown generally at 18, is provided which is capable of selectively focusing a central portion of the beam and a peripheral portion of the beam. A first focusing element is shown at 20. Element 20 includes a collar 22 which is non-rotatably attached to frame 12 by means which will be described later herein. Also included in element 20 is a lens carrying portion 24 which includes a sleeve 26. Lens carrying portion 24 is slidably and non-rotatably received on collar 22 and is operable to focus the peripheral portion of the beam. Portion 24 has a focusing lens 25 carried therein to focus the peripheral portion of the beam.

Figure 3:
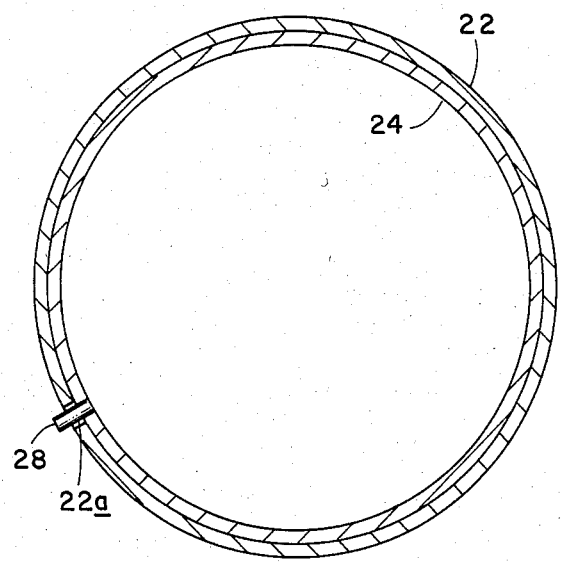
FIG. 3 is a sectional view of a projection lens taken generally along the line 3—3 of FIG. 1.

Referring now to FIGS. 1 and 3, linear displacement means are provided to prevent rotation of portion 24 relative collar 22. In the preferred embodiment, linear displacement means takes the form of a pin 28 which passes through a slot 22a in collar 22. Pin 28 is attached to lens carrying portion 24 and projects through slot 22a.

A second focusing element 30 is rotatably received on sleeve 26 and is operable by means of another focusing lens 31 carried therein to focus the central portion of the beam.

Figure 4:
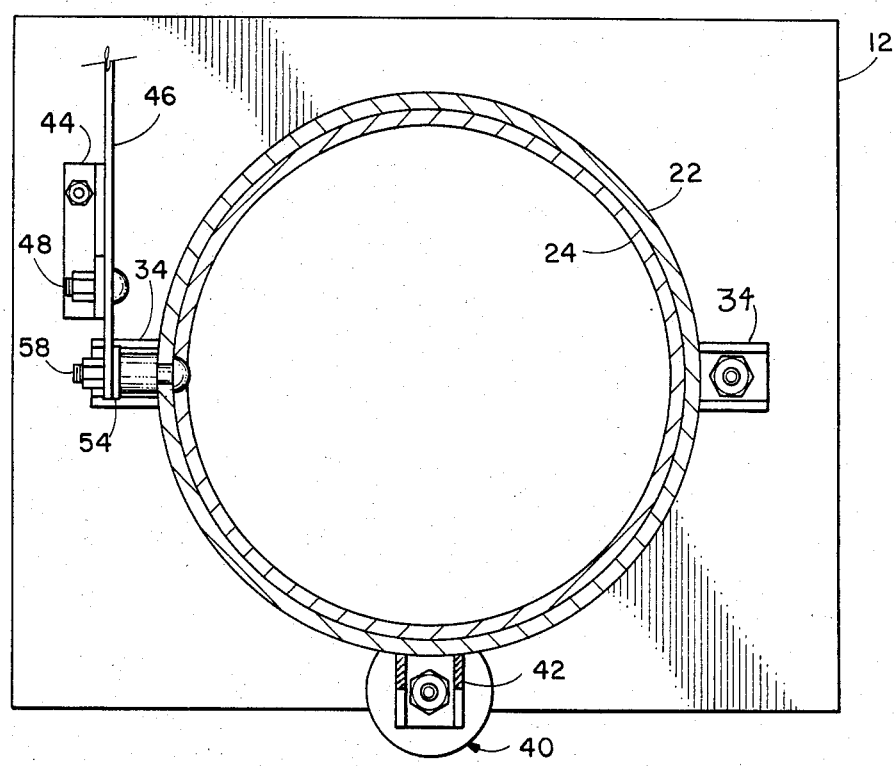
FIG. 4 is a sectional view of a projection lens and a portion of the focus adjustment mechanism taken along the line 4—4 of FIG. 1.

Referring now to FIGS. 1 and 4, lens 18 is supported on frame 12 by support means 32. Support means 32 pivotally and rotationally supports lens 18 relative frame 12 so that lens 18 may be angled independently of frame 12 for eliminating distortion in a projected image. Support means 32 includes brackets 34, mounted on opposing sides of collar 22. Each bracket 34 is attached to frame 12 by a universal hinge 36. Hinge 36 is of the ball-and-cup type and includes cup 36a, ball and extension 36b and a stud 36c, which is secured to frame 12. Stud 36c and ball 36b are conformally threaded such that 36b may be adjusted along the length of stud 36c thereby displacing lens 18 in a horizontal plane. Collar 22 and support means 32 comprise what is referred to herein as retaining means.

A vertical adjustment mechanism is shown generally at 38. The vertical adjustment mechanism includes a jack screw, shown generally at 40 which includes an adjustment ring 40a and a threaded shaft 40b. Adjustment ring 40a is journaled in a bracket 42 which is attached to collar 22. By rotating ring 40a, lens 18 may be adjusted in a vertical plane. Details of support means 32 and vertical adjustment mechanism 38 may be found in my copending application Ser. No. 678,151, entitled Video Projector Lens Angulation Mechanism and filed on this same date, which is incorporated herein by reference.

Figure 2:
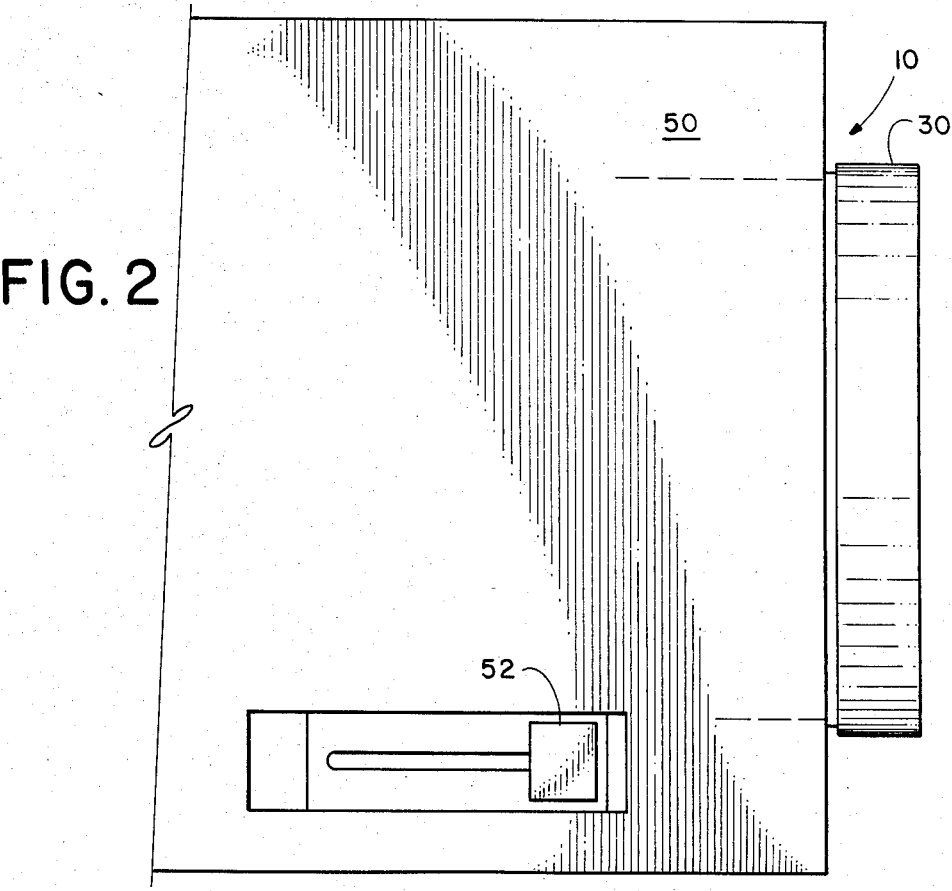
FIG. 2 is a top view of a portion of a video projector with a front cover in place.

A first focusing means for slideably focusing the first focusing element is provided. With reference to FIGS. 1, 2 and 4, the first focusing means includes a bracket 44 which is secured to frame 12. A lever 46 is pivotally supported on bracket 44 by pivot shaft 48. Lever 46 extends through a cover 50 and has a focusing knob 52 attached at its end. One end of a connecting arm 54 is attached to lever 46 by another pivot shaft 56. The opposite end of arm 54 is secured to lens carrying portion 24 by shaft 58. Movement of knob 52 from the position shown in solid lines if FIG. 1 to that shown in the phantom line results in the sliding of lens carrying portion 24 relative collar 22 to the right as viewed in the drawing. Pin 28 of the linear displacement means prevents rotation of lens carrying portion 24 relative to collar 22.

Figure 5:
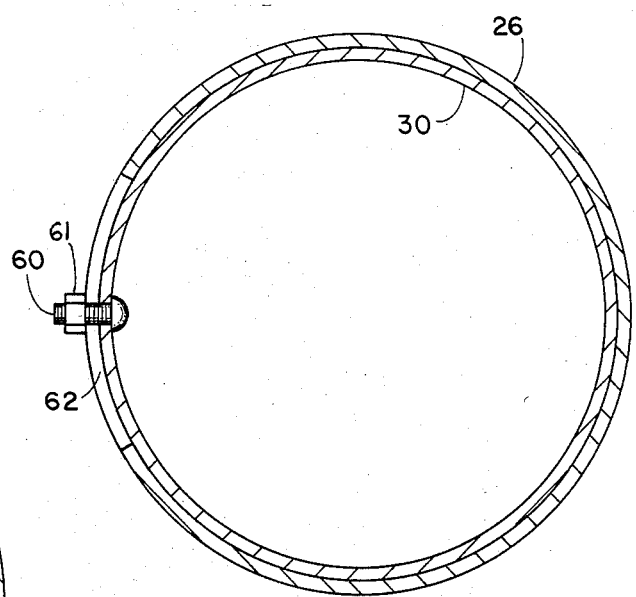
FIG. 5 is a sectional view of a second focusing means, taken along the line 5—5 in FIG. 1.

Second focusing means for rotatably focusing the second focusing element are provided. As shown in FIGS. 1 and 5, second focusing means includes a threaded shaft 60 which is carried on the second focusing element and extends through diagonal slot 62 which is formed in a side of sleeve 26. With rotation of second element 30, shaft 60 moves along slot 62 (phantom line) thereby moving element 30 relative sleeve 26 and adjusting the focus of the central portion of the image. A nut 61 is provided for shaft 60 in the depicted embodiment to permit adjustment of the resistance of element 30 to rotation. Nut 61 is not, however, a necessary feature of the present invention.

In operation, the projector is set up spaced apart from a projection screen and an image is projected on the screen. Distortion is substantially eliminated in the image through manipulation of the support means and the vertical adjustment mechanism. The image is initially focused through movement of knob 52 thereby focusing a peripheral portion of the beam or image. Second focusing element 30 is then rotated until the central portion of the beam is in focus. Thus the central portion of the image may be focused without disturbing the focus on the peripheral portion of the image.

While a preferred embodiment of the invention has been disclosed, it is to be appreciated that variations and modifications may be made without departing from the spirit of the invention.

It is claimed and desired to secure by Letters Patent:

1. A focus adjustment mechanism for use on a projector, the projector having a frame and projection lens, the projection lens having first and second focusing elements, wherein the mechanism comprises:
   first focusing means for longitudinally and nonrotatably focusing the first focusing element;
   second focusing means for rotatably focusing the second focusing element; and
   retaining means for retaining said first focusing element nonrotatably on the frame, wherein said first focusing element includes a lens carrying portion slidably received on said retaining means, said first focusing means including a bracket affixed to the frame, and a lever pivotally mounted on said bracket and attached to said lens carrying portion, operable to longitudinally slide said lens carrying portion relative said retaining means.

2. The mechanism of claim 1, which further includes linear displacement means for inhibiting rotation of said lens carrying portion relative said retaining means wherein said linear displacement means is attached to said lens carrying portion.

3. The mechanism of claim 1, wherein said lens carrying portion includes a sleeve and said second focusing element is rotatably received on said sleeve.

4. The mechanism of claim 3, wherein said second focusing means includes means for rotatably adjusting the focus of said second focusing means with rotation of said second focusing means relative said first focusing means.

5. A video projector comprising:
   a frame,
   imaging means mounted on said frame which transmits a visually perceptible beam having central and peripheral portions and an image axis, wherein the central and peripheral portions of the beam require different focal refractions to form a coherent image when viewed on a generally planar screen at a distance from the projector,
   a cylindrical projection lens which includes a first focusing element non-rotatably secured to the frame, a lens carrying portion slidably and non-rotatably received at one end thereof and having a sleeve on the other end thereof, and a second focusing element rotatably received on said sleeve,
   first focusing means secured to said frame and operable for slidably focusing a portion of the beam passing through said first focusing element on the screen, and
   second focusing means operable for adjusting the focus of the central portion of the projected beam as said second focusing element is rotated relative said sleeve.

6. In combination with a video projector having a frame, where an image generated by the projector includes central and peripheral portions which require multiple focusing settings to become a coherent projected image, a focus adjustment mechanism comprising:
   a projection lens having first and second focusing elements, said first focusing element including a collar which is non-rotatably secured to the frame and a lens carrying portion slidably received on said collar,
   first focusing means operably connected to said first focusing elements for non-rotatably focusing a peripheral portion of a projected image, and
   second focusing means operably connected to said second focusing element for focusing a central portion of a projected image.

7. The combination of claim 6, wherein said first focusing means includes a bracket affixed to the frame, and a lever pivotably mounted on said bracket and attached to said lens carrying portion operable to slide said lens carrying portion relative said collar.

8. The combination of claim 6, wherein said first focusing element further includes a sleeve portion, said second focusing element is rotatably received on said sleeve portion and said second focusing means includes means for adjusting the focus of the central portion of the projected image as said second focusing element is rotated relative said sleeve portion.

* * * * *